United States Patent [19]
Li

[11] Patent Number: 5,619,331
[45] Date of Patent: Apr. 8, 1997

[54] MONITORING THE EFFECT OF READ/WRITE ELEMENT ON THE EFFECTIVE OPTICAL CONSTANTS OF THE $AL_2O_3$ FILM BY USING A REFLECTOMETER

[75] Inventor: YuFeng Li, Fremont, Calif.

[73] Assignee: Samsung Electronics, Ltd., Rep. of Korea

[21] Appl. No.: 688,013

[22] Filed: Jul. 26, 1996

[51] Int. Cl.$^6$ .................................................. G01B 11/00
[52] U.S. Cl. ........................... 356/394; 356/373; 369/13; 360/114; 360/103
[58] Field of Search ................................... 356/394, 373; 369/13; 360/114, 103

[56] References Cited

U.S. PATENT DOCUMENTS

| | | | |
|---|---|---|---|
| 4,493,554 | 1/1985 | Pryor et al. | 356/394 |
| 5,247,493 | 9/1993 | Kime et al. | 369/13 |

Primary Examiner—Frank Gonzalez
Assistant Examiner—Reginald A. Ratliff
Attorney, Agent, or Firm—Blakely Sokoloff Taylor & Zafman

[57] ABSTRACT

A monitor and method for monitoring the optical properties of a recording head of a hard disk drive. The monitor includes a light source that reflects a light beam off of the recording head. The reflected light beam is detected by a photodetector. The light beam directed onto the head has an intensity Ii. The light beam reflected from the head has an intensity Io. The photodetector and light source are coupled to a controller which calculates a reflectance R based on the ratio of the intensities Ii and Io. The reflectance R is a function of the optical properties of the recording head. The calculated reflectance R is compared with a threshold value. If the reflectance R exceeds the threshold value the monitor may provide a part fail message which indicates that the optical properties off a particular head deviates from a range of values. The present invention provides a means to quickly monitor the optical properties of recording heads without actually measuring the properties.

10 Claims, 1 Drawing Sheet

MONITORING THE EFFECT OF READ/WRITE ELEMENT ON THE EFFECTIVE OPTICAL CONSTANTS OF THE AL₂O₃ FILM BY USING A REFLECTOMETER

BACKGROUND OF THE INVENTION

1. Field of the Invention

The present invention relates to an apparatus and method for monitoring the optical properties of a magnetic recording head that is typically installed into a hard disk drive.

2. Description of Related Art

Hard disk drives contain magnetic recording heads which magnetize and sense the magnetic field of a rotating magnetic disk(s). The recording head is integrated into a slider which has hydrodynamic features that create an air bearing between the head and the disk. The air bearing prevents contact and corresponding mechanical wear of the recording head.

The sliders are typically tested in a flying height tester before being installed into a hard disk drive assembly. Flying height testers measure the height of the air bearing mom insure that the slider complies with manufacturing specifications. The sliders "fly" above a transparent disk that is rotated by a spindle. A beam of light is directed through the disk and reflected off of the disk/head interface. The reflected light creates an interference pattern that is detected and analyzed by the tester to determine the flying height of the slider.

The interference pattern is a function of the index of refraction n and the extinction coefficient k of the slider. It has been found that the n and k values may vary from slider to slider. A variation in the optical properties may reduce the accuracy of the flying height tester. The actual n and k values of a slider can be measured using an ellipsometer. The actual values are then used by the flying height tester to measure the height of the air bearing.

A typical recording head contains a read/write element that is buried within a substrate. The trailing edge of the substrate may be constructed from an aluminum oxide ($Al_2O_3$) material. The read/write element is constructed from metal materials such as copper and nickel/iron (NiFe).

The aluminum oxide is a relatively translucent material such that the slider area containing the read/write elements may have different effective n and k values than the remaining portion of the trailing edge. Additionally, manufacturing processes and tolerances may create n and k variations between different points of the slider. The variation in optical properties requires a small beam spot diameter for the flying height tester and a corresponding small beam spot for the ellipsometer to differentiate between the read/write element and the remaining area of the slider. Small beam diameters are difficult to produce. Additionally, small beam diameters increase the time required to measure the n and k values of the slider. It would be desirable to provide a relatively inexpensive apparatus and method for quickly monitoring the optical properties of a recording head.

SUMMARY OF THE INVENTION

The present invention is a monitor and method for monitoring the optical properties of a recording head of a hard disk drive. The monitor includes a light source that reflects a light beam off of the recording head. The reflected light beam is detected by a photodetector. The light beam directed onto the head has an intensity Ii. The light beam reflected from the head has an intensity Io. The photodetector and light source are coupled to a controller which calculates a reflectance R based on the ratio of the intensities Ii and Io. The reflectance R is a function of the optical properties of the recording head. The calculated reflectance R is compared with a threshold value. If the reflectance R exceeds the threshold value the monitor may provide a part fail message which indicates that the optical properties of a particular head deviates from a range of values. The present invention provides a means to quickly monitor the optical properties of recording heads without actually measuring the properties.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
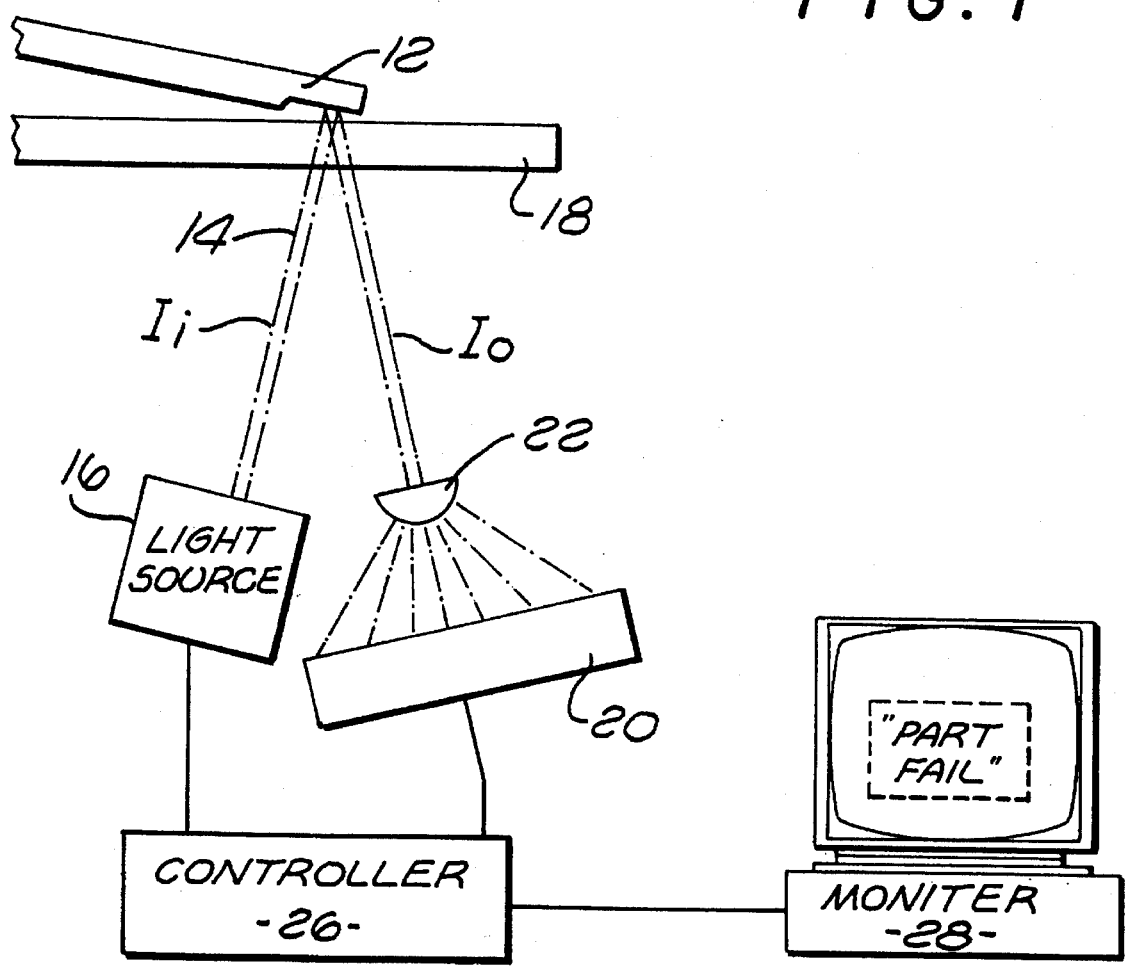
FIG. 1 is a schematic of a monitor of the present invention.

Referring to the drawings more particularly by reference numbers, FIG. 1 shows a monitor 10 of the present invention. The monitor 10 monitors the optical properties of a magnetic recording head 12 that is typically installed into a hard disk drive (not shown). More specifically the monitor 10 monitors the index of refraction n and the extinction coefficient k of the head 12 by calculating the reflectance R of a light beam 14 reflected off of the head 12. The optical constants n and k are related to the reflectance R by the Fresnel equation for normal incidence as follows.

$$R = \left| \frac{1-n+jk}{1+n+jk} \right|^2$$

Any change in the optical constants n and k will produce a corresponding variation in the reflectance R of the reflected light beam 14. The reflectance R can be measured to monitor any variations in the optical constants n and k. It being understood that n and k may vary from head to head. The monitor 10 can also monitor variations in n and k between different points of the recording head 12. The monitor 10 allows an operator to determine which points of the head 12 can be accurately measured with a flying height tester and which points on the head 12 cannot be accurately measured with a flying height tester by monitoring the point to point n and k variations of the recording head.

The monitor 10 has a light source 16 that generates and directs a light beam 14 through a rotating transparent disk 18. The light beam 14 that is directed onto the head 12 has an intensity Ii. The light beam 14 is reflected off of the recording head 12. The light beam reflected from the head 12 has an intensity Io. Although a disk 18 is shown and described, it is to be understood that the monitor 10 may monitor the optical properties without a disk 18.

Figure 1A:
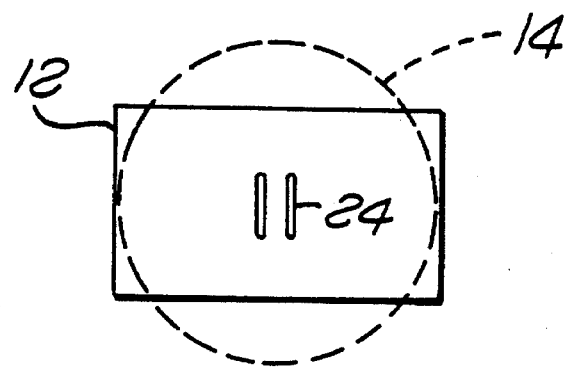
FIG. 1a is a bottom view showing a light beam on a recording head.

The reflected light beam 14 is detected by an array of photodetectors 20. The monitor 10 may include a lens 22 to diverge the reflected light beam 14 over the photodetectors 18 to increase the lateral resolution of the system. As shown in FIG. 1a, the light beam 14 preferably has a spot diameter that is wider than the width of the recording head 12 to cover the entire trailing edge portion of the head 12. Covering the entire area with one beam reduces the time required to monitor the head 12. The wide beam covers the area of the head 12 that contains the read/write element 24 and the remaining portion of the head 12. By covering both areas of the head the device 10 can monitor the effective optical properties of the entire trailing edge portion. The photodetectors 18 can detect point to point variations in the n and k values of the head 12.

The photo detectors 20 and light source 16 are coupled to a controller 26 that can calculate the reflectance R of the light beam 16 by dividing the intensity Io of the reflected light by the intensity Ii of the directed light (e.g. R=Io/Ii). The light source 16, photodetectors 20 and controller 26 may be a reflectometer which measures the reflectance of light. By way of example, the monitor may utilize the reflectance feature of a MHT profilometer sold by WYKO of California to measure the reflectance R of the light beam 14 reflected off of the head 12.

The controller 26 may compare the calculated reflectance R with a threshold value, or a pair of threshold values which define a range of acceptable reflectance's. If the calculated reflectance exceeds a threshold value the controller 20 may provide a "part fail" message on a video monitor 28. The visual message provides an indication to an operator that the head 12 being monitored has an unacceptable variation of the optical properties n and k. The n and k values can then be measured using an ellipsometer (not shown).

In operation, an operator loads a recording head 12 into the monitor 10. A light beam 14 is then reflected off of the head 12 and detected by the photodetectors 20. The controller 26 computes the reflectance R of the light beam and compares the calculated reflectance with a threshold value(s). If the reflectance R exceeds the threshold value(s) the monitor 28 may provide a message to indicate that the optical properties of the recording head 12 have deviated beyond an acceptable value(s). The actual n and k values can then be measured with an ellipsometer before placing the recording head 12 into a flying height tester (not shown) to measure the height of the air bearing created by the head 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A monitor for monitoring an optical property of a recording head, comprising:

a light source that emits a light beam that is reflected off of the recording head, wherein the light beam emitted from said light source has an intensity Ii and the light beam reflected from the recording head has an intensity Io;

a photodetector that senses the reflected light beam; and, a controller that is coupled to said light source and said photodetector and which calculates and monitors a reflectance R based on the intensities Ii and Io.

2. The monitor as recited in claim 1, wherein said controller compares the reflectance R with a threshold value.

3. The monitor as recited in claim 1, wherein the light beam has a diameter that is greater than a width of the recording head.

4. The monitor as recited in claim 1, further comprising a lens that diverges the reflected light beam onto said photodetector.

5. A monitor for monitoring an optical property of a recording head, comprising:

a light source that emits a light beam that is reflected off of the recording head, wherein the light beam emitted from said light source has an intensity Ii and the light beam reflected from the recording head has an intensity Io;

an array of photodetectors that sense the reflected light beam;

a controller that is coupled to said light source and said photodetectors and which calculates a reflectance R based on the intensities Ii and Io, and compares the reflectance R with a threshold value; and, a readout device which provides an indication of a part failure if the reflectance R exceeds the threshold value.

6. The monitor as recited in claim 5, wherein the light beam has a diameter that is greater than a width of the recording head.

7. The monitor as recited in claim 6, further comprising a lens that diverges the reflected light beam onto said photodetectors.

8. A method for monitoring an optical property of a recording head, comprising the steps of:

a) reflecting a light beam which has an intensity Ii off of the recording head, wherein the reflected light beam has an intensity Io;

b) calculating a reflectance R based on the intensities Ii and Io; and, c) comparing the reflectance R with a threshold value.

9. The method as recited in claim 8, further comprising the step of generating a part failure message if the reflectance R exceeds the threshold value.

10. The method as recited in claim 9, further comprising the step of measuring the optical property.

* * * * *